United States Patent
Yamaki

(10) Patent No.: US 6,446,213 B1
(45) Date of Patent: *Sep. 3, 2002

(54) SOFTWARE-BASED SLEEP CONTROL OF OPERATING SYSTEM DIRECTED POWER MANAGEMENT SYSTEM WITH MINIMUM ADVANCED CONFIGURATION POWER INTERFACE (ACPI)-IMPLEMENTING HARDWARE

(75) Inventor: Masayo Yamaki, Tokyo (JP)

(73) Assignee: Kabushiki Kaisha Toshiba, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/144,283

(22) Filed: Aug. 31, 1998

(30) Foreign Application Priority Data

Sep. 1, 1997 (JP) .............................................. 9-235697

(51) Int. Cl.[7] .............................. G06F 1/26; G06F 1/28; G06F 1/30
(52) U.S. Cl. ............................... 713/300; 713/1; 713/2; 713/323; 713/324; 713/310; 713/320; 713/321; 713/322; 713/330; 713/340
(58) Field of Search ................................ 713/300, 324, 713/323, 1, 2, 310, 320, 321, 322, 330, 340

(56) References Cited

U.S. PATENT DOCUMENTS

| | | | | |
|---|---|---|---|---|
| 5,396,635 A | * | 3/1995 | Fung | 712/1 |
| 5,469,553 A | * | 11/1995 | Paul | 713/323 |
| 5,560,023 A | | 9/1996 | Crump et al. | 713/300 |
| 5,706,407 A | * | 1/1998 | Nakamura et al. | 395/86 |
| 5,752,044 A | * | 5/1998 | Crump et al. | 713/300 |
| 5,878,264 A | * | 3/1999 | Ebrahim | 713/324 |
| 5,919,264 A | * | 7/1999 | Reneris | 713/324 |
| 5,931,950 A | * | 8/1999 | Hsu | 713/300 |
| 5,944,831 A | * | 8/1999 | Pate et al. | 713/324 |
| 6,185,677 B1 | * | 2/2001 | Nijhawan | 713/2 |
| 6,266,776 B1 | * | 7/2001 | Sakai | 713/300 |

OTHER PUBLICATIONS

Advanced Configuration and Power Interface Specification by Intel, Microsoft and Toshiba, Rev. 1.0a, Jul. 1, 1998.*
Structured Computer Organization, Third Edition by Andrew S. Tatenbaum, 1990.*
"Advanced Configuration and Power Interface Specification", Revision 1.0, by Intel, Microsoft and Toshiba, Dec. 22, 1996.

* cited by examiner

Primary Examiner—Ayaz Sheikh
Assistant Examiner—Frantz Blanchard Jean
(74) Attorney, Agent, or Firm—Finnegan, Henderson, Farabow, Garrett, & Dunner, L.L.P.

(57) ABSTRACT

Before a register provided exclusively for an Advanced Configuration and Power Interface (ACPI) is set, a System Management Interrupt (SMI) is issued to a Central Processing Unit (CPU). A System Management-Basic Input Output System (SM-BIOS) performs the power management of a computer system. Values representing a wakeup factor of the system and a power management event are set in the register, and an Operating System Directed Power Management System (OSPM) is informed of a Power Management Event (PME). When the values are set in the register, an SMI is issued to the CPU, and the SM-BIOS performs the power management of the computer system.

8 Claims, 12 Drawing Sheets

SOFTWARE-BASED SLEEP CONTROL OF OPERATING SYSTEM DIRECTED POWER MANAGEMENT SYSTEM WITH MINIMUM ADVANCED CONFIGURATION POWER INTERFACE (ACPI)-IMPLEMENTING HARDWARE

BACKGROUND OF THE INVENTION

The entire contents of Japanese Patent Application No. 9-235697 filed on Sep. 1, 1997 are incorporated herein by reference.

The present invention relates to a computer system and, more particularly to a power-supply control management of a computer system.

As microcomputer technology advances, various types of portable computers are developed at present. They are designed to be driven by batteries. The higher the performance of the CPU used in a portable computer, the greater the power consumption of the portable computer. The greater the power consumption, the harder it will be to lengthen the time the computer can be battery-driven. Various attempts have been made to save power in portable computers.

A portable computer has been developed which has a power-management (APM) driver provided between the BIOS (Basic Input and Output System) and the OS (Operating System). The APM driver is designed to control the power supply in the portable computer.

To achieve power-supply management (APM), the OS monitors the idle state of the CPU and the BIOS and hardware monitor the peripheral devices. The BIOS controls the CPU clock (either reducing the clock speed or stopping the clock) or stops the supply of power to the peripheral devices of the computer system. (Hereinafter, an OS having the conventional functions will be referred to as "legacy OS," and PC hardware having the conventional functions will be referred to as "legacy hardware.")

Since the BIOS needs to achieve the power management in the computer system, the BIOS codes are complex. That is, the BIOS prepares the guideline of power management.

Recently, Microsoft of the U.S. has proposed a new power management function called "OnNow" for use in personal computers. OnNow sets a power-management function in the operating system (OS) of a personal computer. OnNow performs management on all power-management data items, including the execution requests supplied from the application software, the wakeup requests issued by the peripheral devices, the request issued when the temperature in the personal computer rises above a predetermined value, the data representing the amount of power remaining in the battery and the voltages of the terminals, and the timer data for use in detecting the idling state of the CPU. An advanced configuration and power interface (ACPI) is provided between the OS and the BIOS to implement OnNow. The OS can acquire the power-management data items from the BIOS through the ACPI.

Therefore, the integrated power management can be accomplished in the OS. The BIOS no longer needs to detect whether or not the CPU is idling. The function of the CPU is now thereby simplified. The OS which can perform integrated power management shall be hereinafter referred to as "OSPM (Operating System Directed Power Management System)."

For implementation of an OSPM, the ACPI demands the legacy hardware have additional registers of several types. The ACPI must perform all power management functions, including sleep control, the power supply switch control, and the like, by means of hardware only, in accordance with the statuses set in the additional registers. The ACPI-implementing hardware inevitably becomes complicated. This is indeed a problem.

BRIEF SUMMARY OF THE INVENTION

The object of the present invention is to provide a computer system in which the power management is accomplished by a hardware simulation (software) function performed before and after statuses are set in the registers dedicated to the ACPI, and in which the ACPI-implementing hardware is thereby reduced to a minimum.

A computer system according to the invention comprises has an operating system (OS) which incorporates a power management function. The system comprises: a central processing unit; a register for storing a sleep state instruction set by the operating system; and means for setting the computer system into a sleep state in a system management mode of the central processing unit.

If the conventional computer system is set into a sleep state by means of hardware only, it is necessary to implement dedicated hardware in the system for setting the system into a plurality of sleep states. Such hardware need not be implemented in the computer system according to the present invention, because the system can be set into each sleep state requested by the OS, in the system management mode of the central processing unit.

A computer system of another type, according to the present invention has an operating system (OS) incorporating a power management function. This system comprises: a central processing unit; first means for receiving a wakeup factor of the computer system; a register for storing data representing that a wakeup factor has been generated, thereby to inform the operating system of a power management event; and second means for setting the wakeup factor in the register when the first means receives the wakeup factor, in a system management mode of the central processing unit.

In the conventional computer system, hardware items must be implemented to manage various power management events, each for one power management event. Such hardware items need not be used in the computer system according to the present invention, because the wakeup factor can be set in the ACPI register by software routines, while the central processing unit is operating in system management mode.

A computer system of still another type, according to the invention has an operating system incorporating a power management function. The computer system comprises: a central processing unit; a register for storing data representing that a power management event has occurred, thereby to inform the operating system of the power management event; means for setting a value in a register assigned to the event, before the operating system is informed of the event, while the central processing unit is operating in system management mode.

Since the operating system is informed of a power management event, if any, after the value is set in the register assigned to the event while the central processing unit is operating in system management mode, it is easy for the OS to determine the power management event.

As described above, the present invention can provide a computer system in which the power management is achieved before and after statuses are set in the registers dedicated to the ACPI by means of hardware simulation (software), minimizing the hardware required for the ACPI.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An embodiment of the present invention will be described, with reference to the accompanying drawings.

Figure 1:
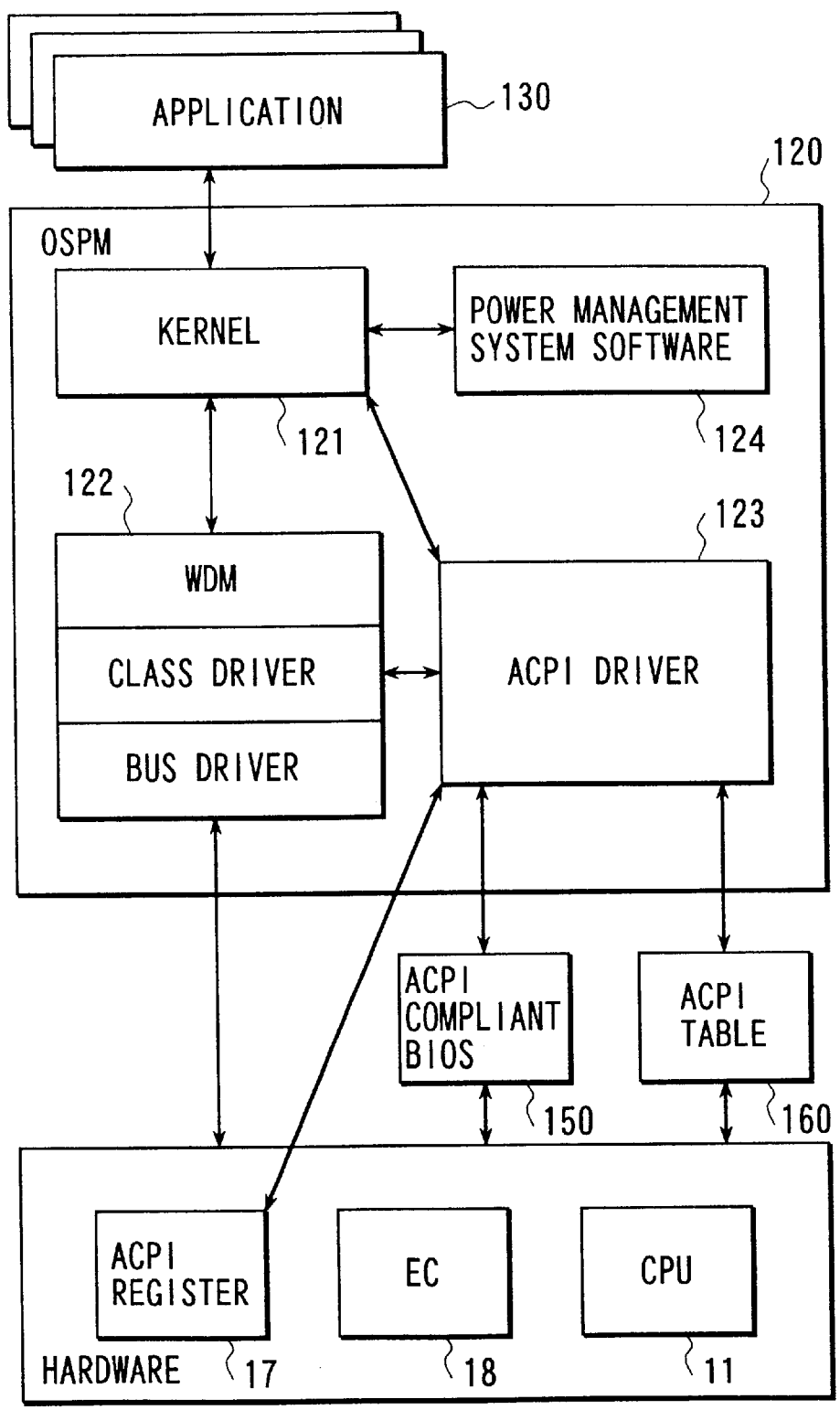
FIG. 1 is a block diagram illustrating a software management system according to an embodiment of the invention.

FIG. 1 shows a computer system according to an embodiment of the present invention. The computer system is a notebook-type personal computer which can be driven by a battery. Provided in the computer system is ACPI (Advanced Configuration and Power Interface) which has been devised by Toshiba, Intel and Microsoft. In the ACPI, the operating system (OSPM) 120 directly manages and controls the power supplied to the various hardware items mounted on the mother board.

As shown in FIG. 1, the OSPM 120 comprises a kernel 121, a device driver 122, an ACPI driver 123, and power-management system software 124. The device driver 122 is a standard interface designed to achieve power management and includes a class driver, a bus driver, and a driver unit. The class driver manages the power to the devices. The bus driver manages the buses (i.e., PCI bus, USB and the like). The driver unit is adapted to WDM (Windows Driver Model). The ACPI driver 123 uses an ACPI complaint BIOS 150, an ACPI table 160 and an ACPI register 17 to control the power to the hardware. The characteristics of the hardware items are described in the ACPI table 160, using a language called "AML code" which defines the interface to the hardware and which the OS can execute. More precisely, the OSPMI 120 interprets an ACPI machine language (AML) stored in an ACPI table. In practice, the hardware power management is performed by an ACPI register 17 which corresponds to the device. The power-management system software 124 is comprised of OSPM system codes and executes tasks to achieve power management.

Figure 2:
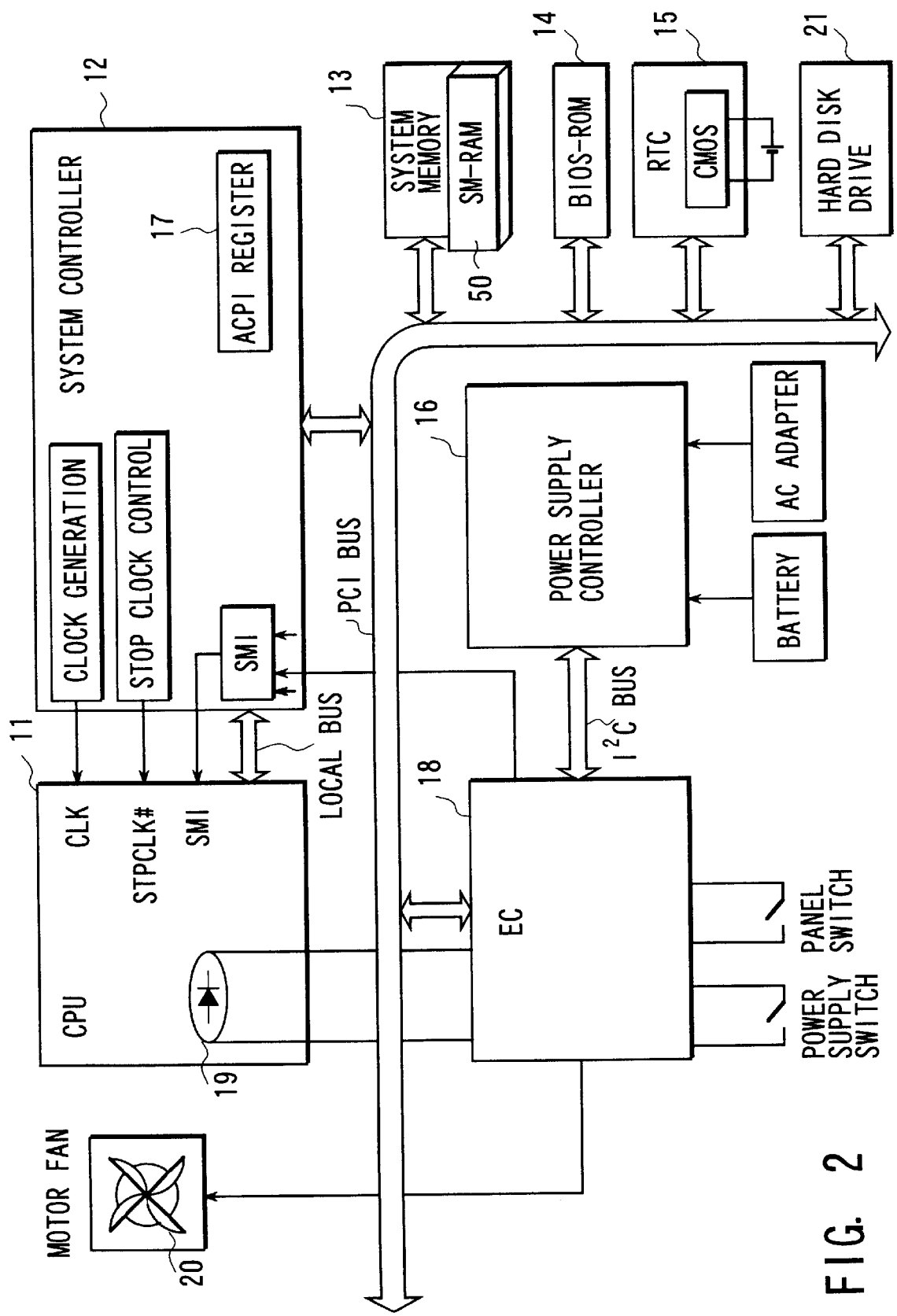
FIG. 2 is a block diagram representing the entire hardware configuration implemented in the computer system which is an embodiment of the present invention.

FIG. 2 represents the entire hardware configuration implemented in the computer system. As seen from FIG. 2, the computer system comprises a CPU 11, a system controller 12, a system memory 13, a BIOS-ROM 14, a real time clock (RTC) 15, a power supply controller 16, an embedded controller 18, a temperature sensor 19, a motor fan 20, and a hard disk drive 21.

Figure 3:
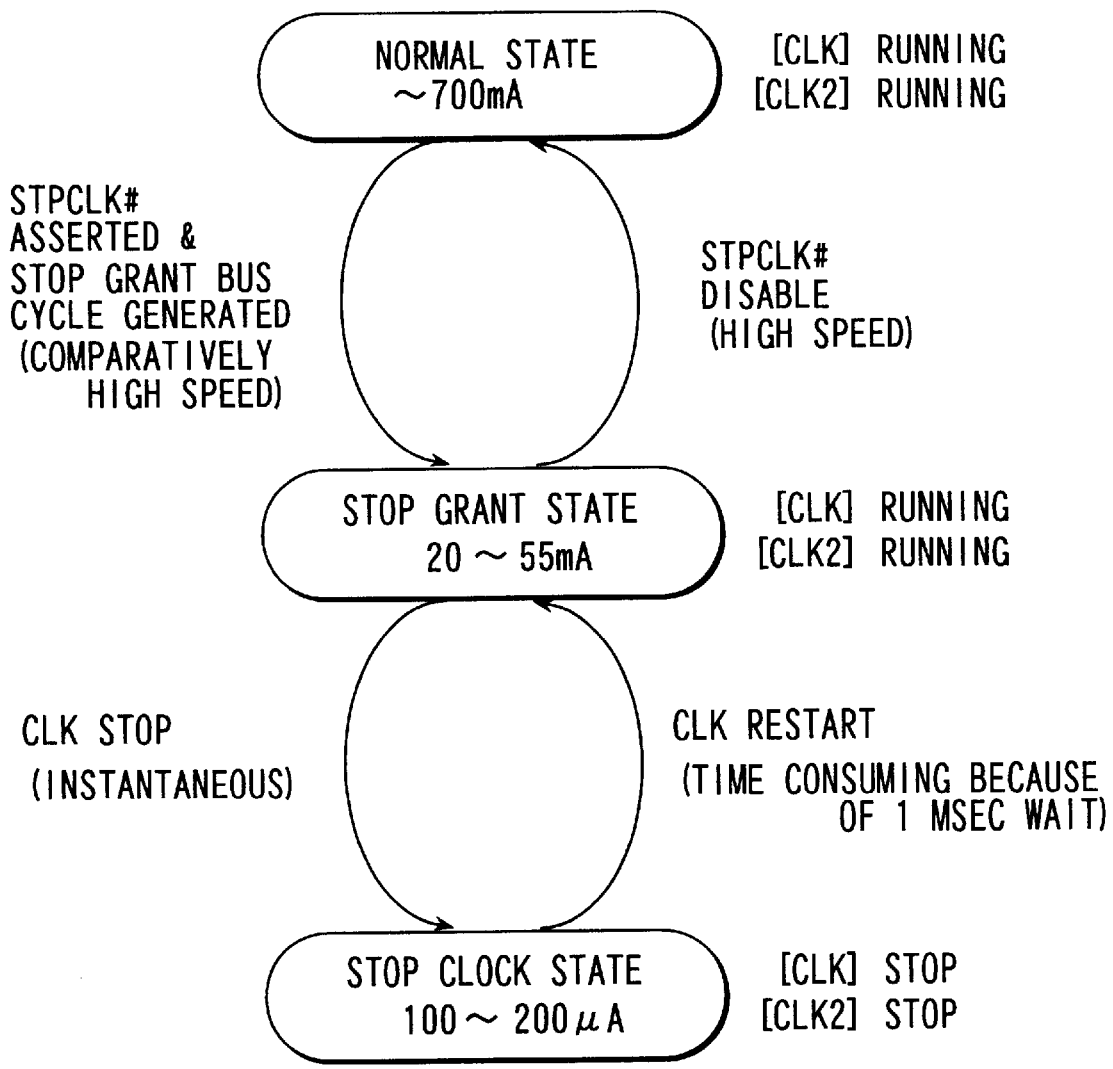
FIG. 3 is a diagram illustrating the transition of operation of the CPU incorporated in the computer system according to the invention.
Figure 4A:
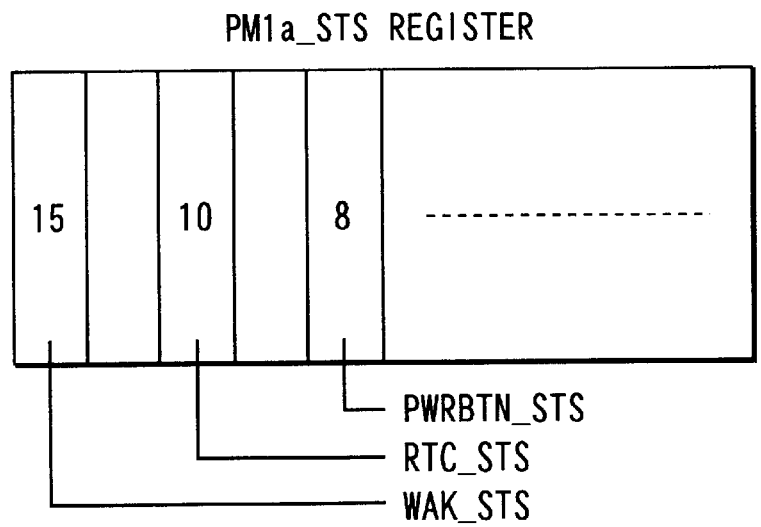
FIGS. 4A to 4C are diagrams depicting the ACPI registers used in the computer system according to the invention.
Figure 4B:
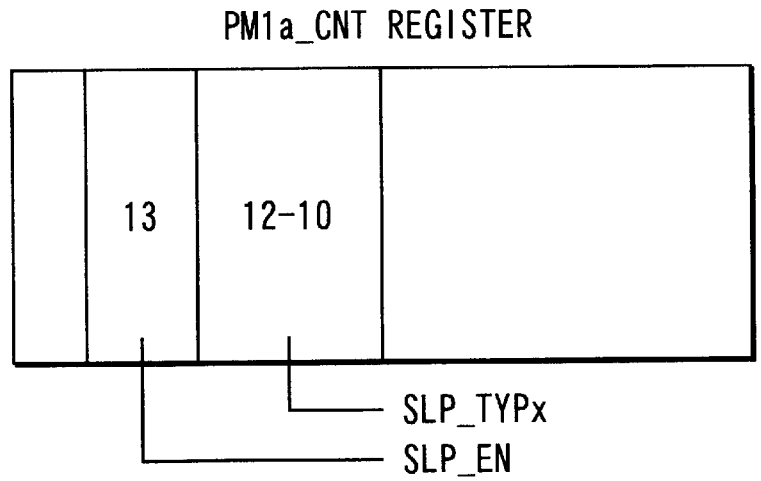
Figure 4C:
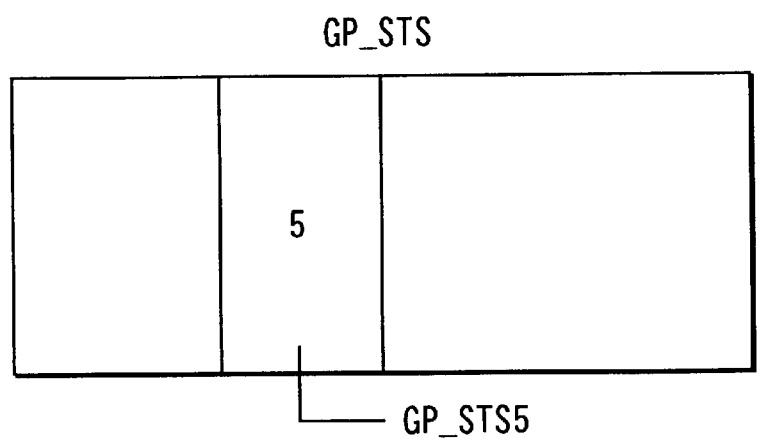

The CPU 11 is, for example, the microprocessor called "Pentium" manufactured and sold by Intel of the U.S. The CPU 11 incorporates a PLL circuit. The PLL circuit generates an internal clock signal CLK2 from an external clock signal CLK. The internal clock signal CLK2 has a frequency as high as or higher than the external clock signal CLK. As shown in FIG. 3, the CPU 11 can take three operating states, i.e., normal state, stop grant state, and stop clock state.

Usually the CPU 11 assumes the normal state. The CPU 11 executes instructions, while remaining in the normal state. In the normal state, the CPU 11 consumes more power than in any other state, operating at a current of about 700 mA at most.

The CPU 11 consumes the least power in the stop clock state, operating at a current of about 100 to 200 µA. In the stop clock state, the CPU 11 cannot execute instructions at all, and both the external clock signal CLK and the internal clock signal CLK2 are stopped.

The stop grant state is, so to speak, an operating state intermediate between the normal state and the stop clock state. In the stop grant state, the CPU 11 operates at a relatively small current, about 20 to 55 mA. As long as the CPU 11 remains in the stop grant state, it cannot execute any instruction. In the stop grant state, both the external clock signal CLK and the internal clock signal CLK2 remain in running state, but the external clock signal CLK2 cannot be supplied to the internal logic (CPU core) provided in the CPU 11. In the stop grant state, the external clock signal CLK can be stopped. When the external clock signal CLK is stopped, the state of the CPU 11 is switched from the stop grant state to the stop clock state.

Assume the STPClK# signal supplied to the CPU 11 is enabled, or set into the active state, while the CPU 11 is operating in the normal state. The CPU 11 makes all internal pipe line empty, upon completely executing the instruction it has been executing. The CPU 11 then executes a stop grant cycle, without executing the next instruction. Upon executing the stop grant cycle, the CPU 11 comes out of the normal state and goes into the stop grant state. The CPU 11 then starts executing the next instruction.

The CPU 11 moves from the stop grant state into the stop clock state the moment the external clock signal CLK is stopped. When the supply of the external clock signal CLK to the CPU 11 is started again while the CPU 11 stays in the stop clock state, the CPU 11 goes into the stop grant state upon lapse of 1 ms. Namely, some time is required to set CPU 11 from the stop clock state into the stop grant state.

The CPU 11 operates at lower power while remaining in the stop grant state than in the normal state. Upon receipt of a STPCLK# signal, the CPU 11 can return to the normal state at high speed in order to execute instructions.

While the computer system remains in a sleep state (S1 state), the CPU 11 is set into the stop clock state so that the supply of the operating clock signal to the CPU 11 may be stopped.

The CPU 11 has the following system management functions.

The CPU 11 can operate in real mode, protect mode, virtual 86 mode to execute programs such as application program 130 and operating program (OSPM) 120. Also the CPU 11 can operate in an operating mode known as "SMM (System Management Mode)" to execute the system management program which is designed exclusively for power management.

In the real mode, the CPU 11 can access a memory space of at most 1 megabytes, and a physical address is defined by the offset value supplied from a base address which is stored in a segment register. In the protect mode, the CPU 11 can access a memory space of at most 4 gigabytes, and a linear address is defined by using an address mapping table which is called "descriptor table." The linear address is ultimately converted to a physical address by means of paging. In the virtual 86 mode, a real-mode program designed to work in the real mode is executed by the CPU 11 in the protect mode. The real-mode program is executed as a task in the protect mode.

The system management mode (SMM) is a pseudo-real mode. In the system management mode, the descriptor table is not referred to, nor is paging performed. When an SMI (System Management Interrupt) is issued to the CPU 11, the operating mode of the CPU 11 is switched from the real mode, protect mode or virtual 86 mode to the system management mode (SMM).

The SMI is a kind of a non-maskable interrupt (NMI) and has priority over an ordinary NMI and a mask enable interrupt (INTR). Upon receipt of the SMI the CPU 11 can activate the various SMI service routines provided as system management programs, not depending upon the application program which is being executed or the OS environment which has been set.

The computer system according to the invention has no hardware which performs power management for the ACPI register 17 (i.e., an additional register). Once set into the system management mode (SMM) upon receipt of an SMI, the CPU 11 performs pre-setting of the ACPI register 17 and then executes hardware simulation.

The system controller 12 is a gate array designed to control the memories and I/Os provided in the computer system. Incorporated in the controller 12 are hardware for generating SMI signals and STPCLK# signals which are to be supplied to the CPU 11. The system controller 12 comprises a clock-generating circuit, an SMI-generating circuit, and a stop clock control circuit. The clock-generating circuit generates the external clock signal CLK. The SMI-generating circuit supplies an SMI to the CPU 11. The stop clock control circuit controls the generation of STPCLK# signals.

The system controller 12 further comprises a plurality of ACPI registers 17 (PM1a_CNT, PM1a_STS, GP_STS), as is illustrated in FIGS. 4A to 4C and FIG. 13.

The PM1a_STS resister comprises PWRBTN_STS, RTC_STS, WAK_STS and the like.

PWRBTN_STS is a register which is set when the power supply switch of the computer system is pushed. When both PWRBTN_EN (not shown) and PWRBTN_STS are set while the computer system remains in the normal state, a system control interrupt (SCI) is issued. The SCI is a system interrupt the hardware uses to inform the OSPM 120 of a power management event (hereinafter referred to as "PME (Power Management Event)." When the power supply switch is depressed while the computer system remains in the sleep state or the soft-off state, a wakeup event is generated in the embedded controller (EC) 18, no matter whether the resister PWRBTN_EN has been set. Usually, the PWRBTN_STS bit is set by the hardware only, if the PWRBTN_STS register is of ACPI specification. The PWRBTN_STS register is reset only when "1" is written at the PWRBTN_STS bit by means of the software.

In the computer system of the invention, the EC 18 issues an SMI before the PWRBTN_STS register is set. In response to the SMI, the SM-BIOS sets the bit, issuing an system control interrupt (SCI) to the OSPM 120.

RTC-STS is a register which is set when the real time clock (RTC) 15 asserts an alarm, i.e., an IRQ signal. If RTC_EN (not shown) is set and if the RT_STS bit is set, the hardware will inform the OSPM 120 of the power management event (PME). Usually, the RTC_STS bit is set by the hardware only, if the RTC_STS register is of ACPI specification. The RTC_STS register is reset only when "1" is written at the RTC_STS bit by means of the software. While the computer system stays in the sleep state, the RTC_STB bit must be set before a control is returned to the OSPM 120 if the real time clock (RTC) 15 has caused a wakeup event.

In the computer system of the invention, the EC 18 issues an SMI before the RTC_STS register is set. In response to the SMI, the SM-BIOS sets the bit, issuing an SCI to the OSPM 120.

WAK_STS is a register which is set when an wakeup event happens as the power supply switch or the real time clock (RTC) 15 is operated while the computer system remains in the sleep state. When the WAK_STS bit is set, the computer system is set into the normal state. According to the ACPI specification, the WAK_STS bit is usually set by the hardware only. The WAK_STS register is reset only when "1" is written at the RTC_STS bit by means of the software.

In the computer system of this invention, the EC 18 issues an SMI before the WAK_STS register is set. In response to the SMI, the SM-BIOS sets the bit, issuing an SCI to the OSPM 120.

The PM1a_CNT register comprises SLP_EN, SLP_TYP and the like.

SLP_TYP defines five sleep states S0 to S5 into which the computer system is set when an SLP_EN bit is set at "1." An _Sx object described in the P code of a DSDT (Differentiated System Description Table) has 3-bit binary values. These binary values are related respectively to the five sleep states the _Sx object defines. The ACPI driver 123 is programmed to extract two of the 3-bit binary values from the _Sx object and set the two binary values at SLP_TYP bits.

SLP_EN is a data-writing bit. When the bit is set, the computer system can be set into the sleep state defined by the value of the SLP_TYP.

The ACPI driver 123 sets the SLP_EN bit and SLP_TYP in order to set the computer system into a sleep state. Hence, the SM-BIOS executes a sleep process in accordance with SLP_TYP.

The GP_STS register comprises GP_STS5 and the like. It issues an SCI, informing the OSPM 120 of an event such as a change in the ambient temperature of the CPU 11, the remaining power in the battery, or the like.

In the computer system according to the present invention, the embedded controller (EC) 18 issues an SMI, and the SM-BIOS sets prescribed bits in the areas of an SMRAM 50 in accordance with the type of the event, thereby setting the above-mentioned GP_STS5.

The system memory 13 is the main memory of the computer system. The memory 13 stores the OSPM 120, the application program 130, the user programs prepared by using the program 130, and the like.

The SMRAM 50 is a memory mapped in a 64-KB address space in the main memory 13, extending from a specified address. The address space in which the SMRAM 50 is mapped is not a fixed one. Rather, it can be moved to any desired position in the 4G-byte CPU memory space, by means of a register called "SMBASE." The SMBASE register cannot be accessed unless the CPU 11 is set in the system management mode (SMM).

When the CPU 11 is set into the system management mode (SMM), the statuses which the registers provided in the CPU 11 assume when an system management interrupt (SMI) is issued are saved in the SMRAM 50. At the same time, the data representing the ambient temperature of the CPU 11 and the remaining power of the battery is saved in the SMRAM 50. Also saved in the SMRAM 50 is an instruction for reading the sleep control program stored in the BIOS-ROM 14.

Figure 5:
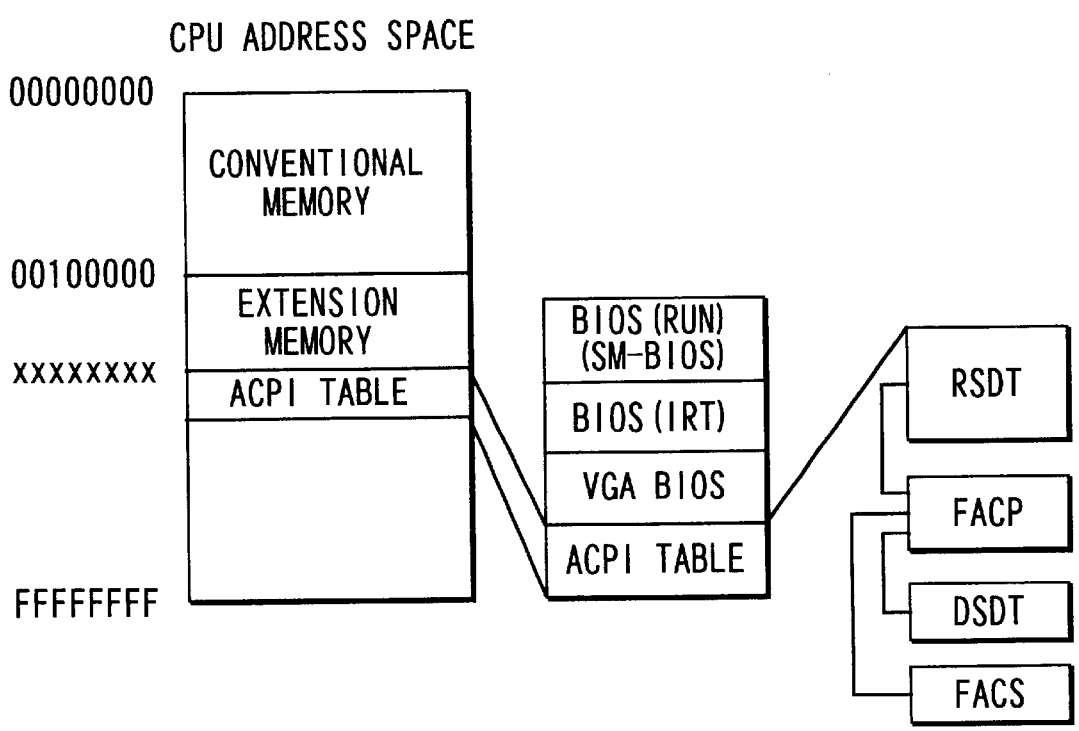
FIG. 5 is a diagram representing the CPU address space provided in the computer system according to this invention.

The BIOS-ROM 14 stores the BIOS (Basic I/O System) as is illustrated in FIG. 5. It is, for example, a flash memory. Thus, the program can be rewritten in the BIOS-ROM 14. The BIOS is so designed as to operate while the CPU 11 remains in the real mode. The BIOS includes a BIOS-IRT routine, a BIOS-RUN, an SM-BIOS, and an ACPI table. The BIOS-IRT routine is executed in order to boot the computer system. The BIOS-RUN controls the various I/O devices. The SM-BIOS and the ACPI table are provided to achieve ACPI compliant power management. The SM-BIOS is a program which the CPU 11 executes in the system management mode (SMM), including an SMI program, an SMI handler and the like. The SMI program includes a routine for the sleep control of the computer system and a routine for setting an event factor in the SMRAM. The SMI handler is a program in the BIOS called by the CPU 11 first.

The SMI handler is a program included in the BIOS and is first read by the CPU 11 when an SMI is generated. The SMI handler checks the factor of SMI generation and calls the SMI routine corresponding to the SMI factor.

The ACPI table 160 is transferred by executing the IRT (Initial Reliability Test) from the flash ROM (i.e., BIOS-ROM 14) to a 64-KB block provided in the CPU address space of 8 megabytes or more. The ACPI table 160 comprises four tables, RSDT, FACP, DSDT, and FACS.

RSDT (Root System Description Table) is a table other than those stored in the main memory 13. FACP (Fixed ACPI Description Table) is always the first table. The FACP is provided to define various static system data items for accomplishing power management. The data stored in the FACP includes various entries of fixed lengths, which describe the ACPI characteristics of the fixed hardware. The FACP refers to DSDT (Differentiated System Description Table) which describes information representing the various characteristics of the computer system. The ACPI driver 123 controls the power supplied to the hardware provided in the computer system in accordance with the hardware-defining blocks (i.e., the objects performing power management on the devices) described in the DSDT in the form of P codes. FACS (Firmware ACPI Control Structure) defines wakeup vectors and the like, thereby to switch the state of the computer system from S3 state to S0 state.

The real time clock (RTC) 15 is a clock module which has a battery for its own, and a CMOS memory to which power is supplied from the battery at all times. The CMOS memory is provided to store information for setting up the system environment and to store an alarm time (years, month and day).

The power supply controller 16 is designed to control the power supply circuit, thereby to supply power to the units provided in the computer system. The controller 16 incorporates a one-chip microcomputer. The power supply controller 16 supplies the embedded controller (EC) 18 with the data which represents condition changes such as the remaining power of the battery and the connection or disconnection of an AC adapter.

The hard disk drive 21 stores the data and files which have been processed by the operating program (OSPM) 120, the application program and the CPU 11.

The embedded controller (EC) 18 has various functions to perform. It controls the power supply sequence, monitors the factors of changes in the power-supply status and provides battery information service. Further, it controls the temperature of the CPU 11 and the LEDs provided on the computer system.

To control the power supply sequence is to control the sequence related to the operation of the power supply switch and the power-supply suspend process.

To monitor the factors of changes in the power-supply status is to monitor the power supply switch, the opening and closing of the operation panel, a wakeup event caused in the RTC 15, the modem link or the like, and a low-battery condition, and a trouble in the power supply.

To provide battery information service is to monitor the attaching and detaching of the battery, fetch the battery information (i.e. the remaining power and changes in condition), and transfer the battery information to the OSPM.

The attaching and detaching of the battery is monitored by the power supply controller 16. The EC 18 receives the data representing the attaching or detaching of the battery, through an IC2 bus. Upon determining the attaching or detaching of the battery, the EC 18 informs the system of the event, by utilizing the system control interrupt (SCI).

When the battery is attached to the computer system, the EC 18 receives the battery information via the $I^2C$ bus before informing the system of the attaching of the battery by using the SCI. The battery information is stored into the SMRAM by means of the SM-BIOS. The EC 18 transfers the power management event (PME) to the system.

The power supply controller 16 transmits the battery information to the EC 18 at regular intervals. Upon detecting a change in the battery information, the EC 18 causes the SM-BIOS to store the battery information into the SMRAM, and transfers the PME to the system.

To control the temperature of the CPU 11 is to monitor the temperature of the CPU 11 at regular intervals of 5 minutes and inform the CPU 11 of the changes, if any, in the temperature. Upon detecting a critical temperature, the EC 18 stops the supply of power to the components of the computer system. If the EC 18 detects a temperature change during a predetermined interval, it supplies the data representing the temperature to the CPU 11, by using the SCI.

To control the LEDs is to control the LEDs in accordance with the sleep state (Sx) of the system.

The embedded controller (EC) 18 keeps operating even while the system remains in the power suspend state or even the power supply switch of the system remains off. Therefore, the EC 18 is driven by a low-frequency clock signal for the purpose of saving power. In the present invention, the battery information and the information showing the temperature of the CPU 11 are transferred to the SMRAM by using the SMI. The battery information and the temperature information are read from the SMRAM in response to the demand from the operating program (OSPM).

How the state of the computer system changes while set in the ACPI mode will be described with reference to FIG. 6.

The ACPI specification defines the suspend state as "sleep," and the resume state as "wakeup." A plurality of sleep states (S0 to S5) are defined. The computer system of the present invention uses the four sleep states S0, S1, S3 and S5, and does not use the sleep states S2 and S4. The transition from one sleep state to another is achieved by setting the SLP_EN bit in the PM1a_CNT register, by means of the OSPM. Upon setting the SLP_EN bit, the OSPM issues an SMI, and the SM-BIOS effects a sleep process.

The sleep state S0 indicates that the OSPM is operating. In this state, the OSPM performs power management (D0 to D3) on the devices incorporated in the computer system and also power management (C0 to C3) on the CPU 11.

Figure 6:
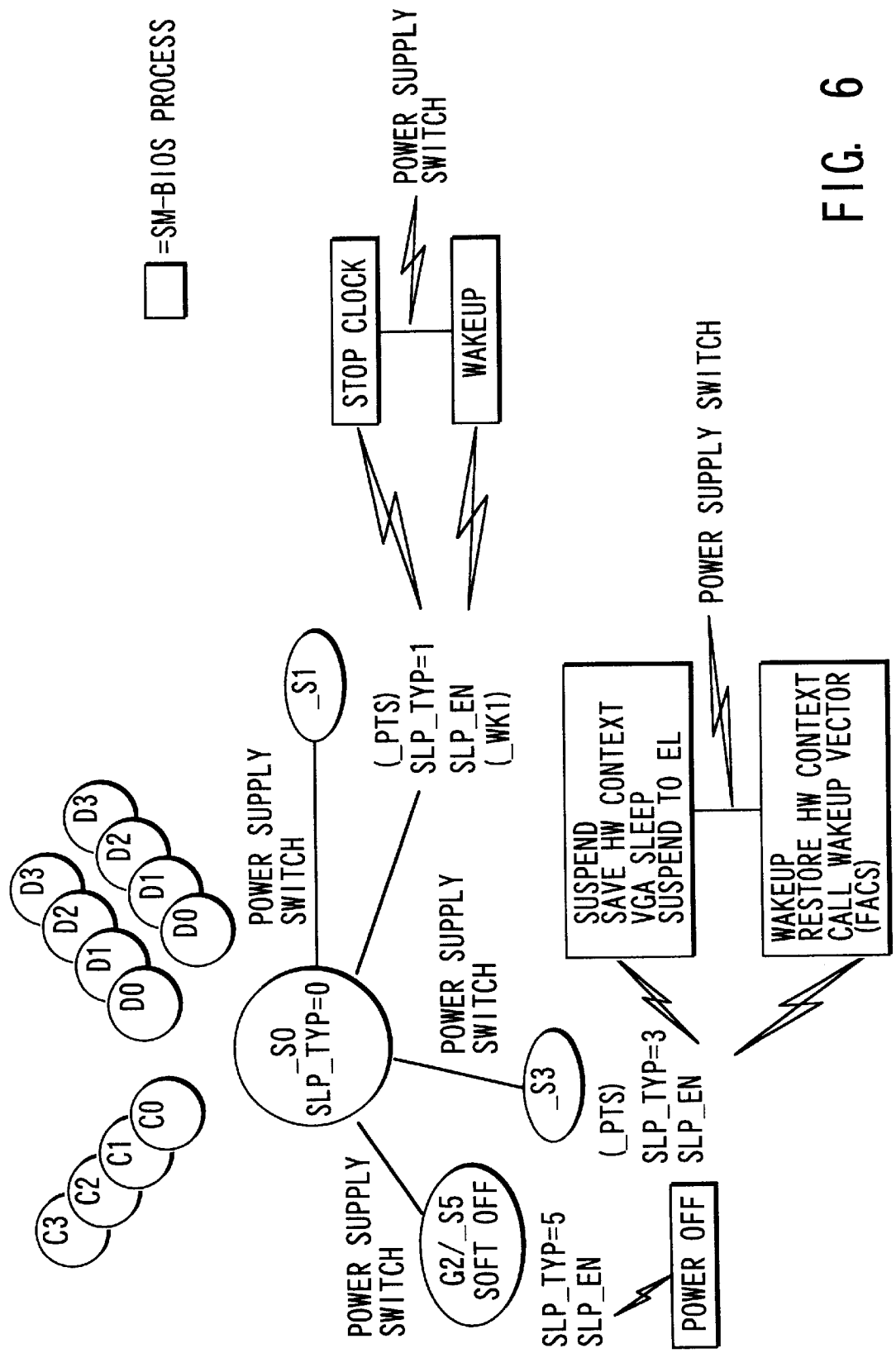
FIG. 6 is a diagram showing the state transition which the computer system undergoes in the ACPI mode.

In FIG. 6, Cx indicates the condition of the CPU power management. C1, for example, indicates the halt condition of the CPU 11. Dx indicates the condition of the device power management. The condition of the device power management has the following four states:

D0: Modem controller on
   Phone interface on
   Speaker on
   Can be on hook or offhook
   Can be waiting for answer D1: Modem controller in low power mode (context retained by device)
   Phone interface powered by phone line or in low power mode
   Speaker off
   Must be on hook D2: same as D3

D3: Modem controller off (context lost)
   Phone interface powered by phone line or off
   Speaker off
   On hook The power policy for the modem is defined as follows:

D3→D0 COM port opened

D0, D1→D3 COM port closed

D0→D1 Modem put in answer mode

D1→D0 Application requests dial or the phone rings while the modem is in answer mode Further, the processor power states (C0 to C3) are defined as follows:

C0: While the processor is in this state, it executes instructions.

C1: This processor power state has the lowest latency.

C2: The C2 state offers power savings over the C1 state.

C3: The C3 state offers power savings of the C1 and C2 states.

The sleep state S1 is a state in which states of the main memory and all the hardware are held. While the system remains in the sleep state S1, no clock signals are supplied to the CPU 11 or the devices. When the EC 18 informs the OSPM of an wakeup event, the supply of clock signals to the CPU 11 and the devices is started. Then, the clock signals are supplied to the CPU 11 and the devices, exactly in the same way as before the system is set into the sleep state S1.

In the present invention, the S1 state process masks all IRQs (i.e., the interrupt requests made by the devices) and the system management interrupts (SMIs), except the SMI made by the EC 18. Only the wakeup request supplied from the EC 18 is thereby made effective, and the supply of the clock signal to the CPU 11 is thereby terminated.

When the EC 18 generates a wakeup request, the SMBIOS releases the IRQs and the SMIs from the masked condition and then sets the WAK_STS register. The sleep state of the computer system is thereby switched from the state S1 back to the state S0.

According to the ACPI specification, the state S3 is a sleep state in which there is no need to hold the preset hardware environment values (hereinafter referred to as HW context), though the value preset for the main memory must be held. This means that the devices are set into this sleep mode when the power supply switch of the system is turned off (D3). In the present invention, however, the HW context is saved in the main memory so as to make it common with the suspend/resume executed by the legacy OS.

Before performing a S3 state process to issue a suspend command to the embedded controller (EC) 18, the SM-BIOS sets the wakeup conditions for the power supply switch, the panel switch, the modem link, the RTC alarm, and the like. To wake up the system from the S3 state, the BIOS calls the wakeup vector provided in the firmware ACPI control structure (FACS) in the real mode after it has initialized the devices and restored the HW context.

The S5 state is a soft-off state (G2). In the S5 state, the supply of power to the computer system is stopped, though power is supplied from the battery to the power supply controller 16 and the embedded controller (EC) 18. No values can be held in the PM1a_CNT register while the system remains in the S5 state, i.e., the soft-off state. Thus, the BIOS set SLP_TYP=5 in order to boot the system.

Assume the OSPM detects a low-battery condition and set the system into the S3 state (i.e., the suspend state). In this case, the SM-BIOS sets the general-purpose PME factor flag and the GP_STS5 bit in the SMRAM and then generates a power management event (PME) by using the system control interrupt (SCI), thereby to resume the operating conditions of the system.

How the event notification is carried out in the computer system will be explained, with reference to FIGS. 7 to 13.

Figure 7:
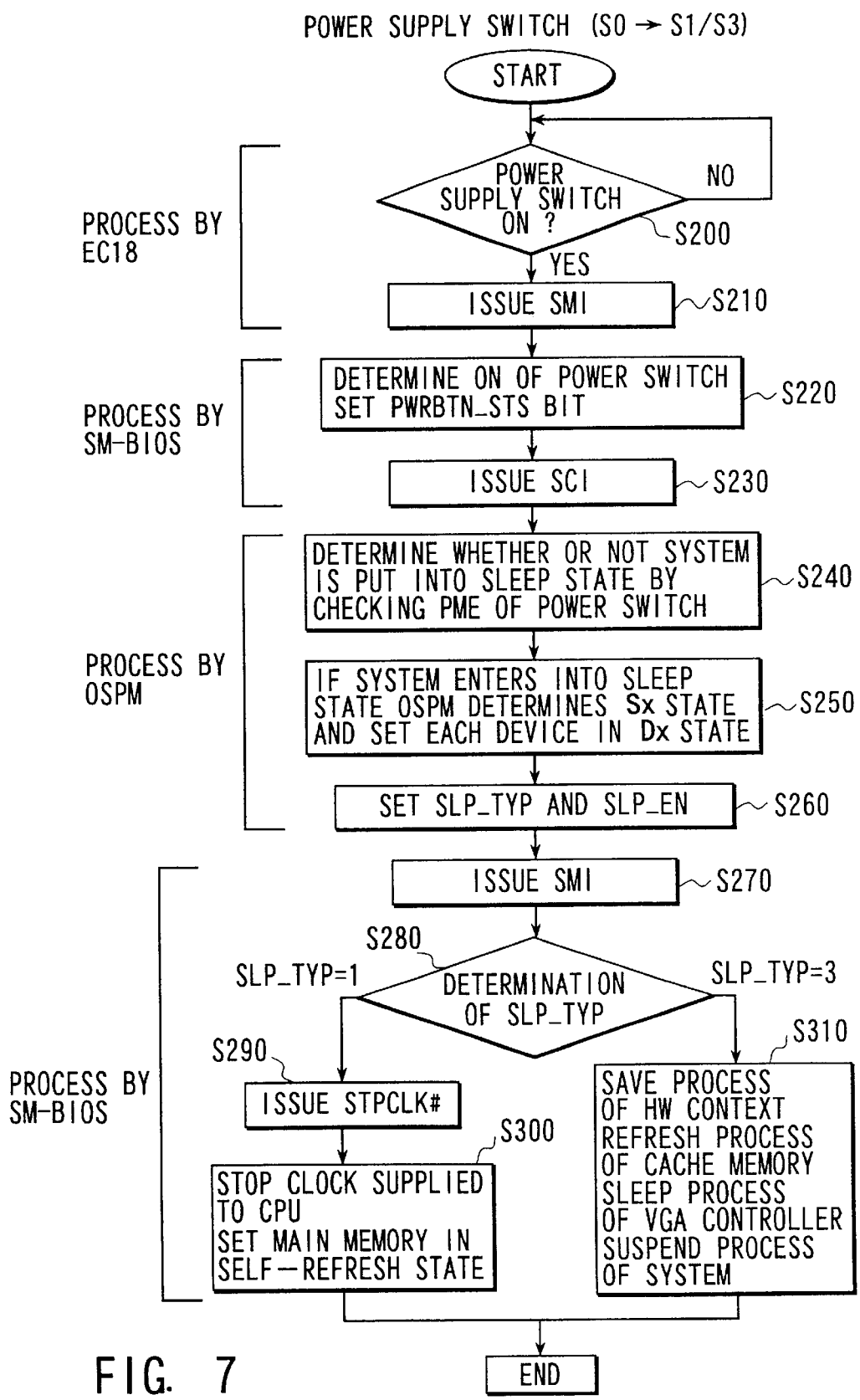
FIG. 7 is a flow chart explaining how event notification (S0→S1/S3) is performed in connection with the power supply switch of the computer system.

FIG. 7 is a flow chart explaining how event notification (S0→S1/S3) is effected in connection with the power supply switch of the computer system.

Upon detecting that the power supply switch is pushed, the EC 18 activates the SM-BIOS by using an SMI (Steps 200 and 210). The SM-BIOS determines that the SMI has been issued due to the power supply switch, and set the PWRBTN_STS bit in the PM1a_STS register (Step 220). After setting the PWRBTN_STS bit, the SM-BIOS automatically issues an SCI, informing the OS of the PME (Step 230).

The operating program (OSPM) determines the PME of the power supply switch from the contents of the PWRBTN_STS bit, and determine whether or not the system should be set into a sleep state (Step 240). The OSPM checks any device provided in the system that can issue a wakeup request, on the basis of the sleep state described in P codes in the differentiated system description table (DSDT). If the system enters into a sleep state, the OSPM determines an Sx state from the P code in DSDT and sets all devices in an Dx state (Step 250). Further, the OSPM sets one of the three SLP_TYP bits and also sets the SLP_EN bit in the PM1a_CNT register, thereby setting the system into the sleep state (Step 260). To set the system into, for example, the S3 state, the OSPM sets the third SLP_TYP bit (SLP_TYP=3). To set the system into the S1 state, the OSPM sets the first SLP_TYP bit (SLP_TYP=1). Then, the OSPM clears the WAK_STS bit in the PM1a_STS register.

When the SLP-EN bit is set, the OSPM automatically issues an SMI, activating the SM-BIOS (Step 270). Thus, the system is set into the sleep state which the OSPM has requested, thanks to the operations performed in the SM-BIOS.

If SLP_TYP=1, the SM-BIOS issues STPCLK# to the CPU 11, setting the CPU 11 into the stop grant state (Steps 280 and 290). Next, the SM-BIOS controls the clock control circuit provided in the system controller to stop the supplement of the clock to the CPU 11, thereby setting the CPU 11 into the stop clock state. The SM-BIOS sets the main memory into the self-refresh state, which the main memory will maintain by itself. Then, all system clock signals are stopped (Step 300).

If SLP_TYP=3, the SM-BIOS stores the HW context into the main memory before the system goes into the suspend state, thereby flashing the cache memory. The SM-BIOS then clears the SLP_EN bit and issues a power supply suspend instruction to the embedded controller (EC) 18 (Steps 280 and 310).

Figure 8:
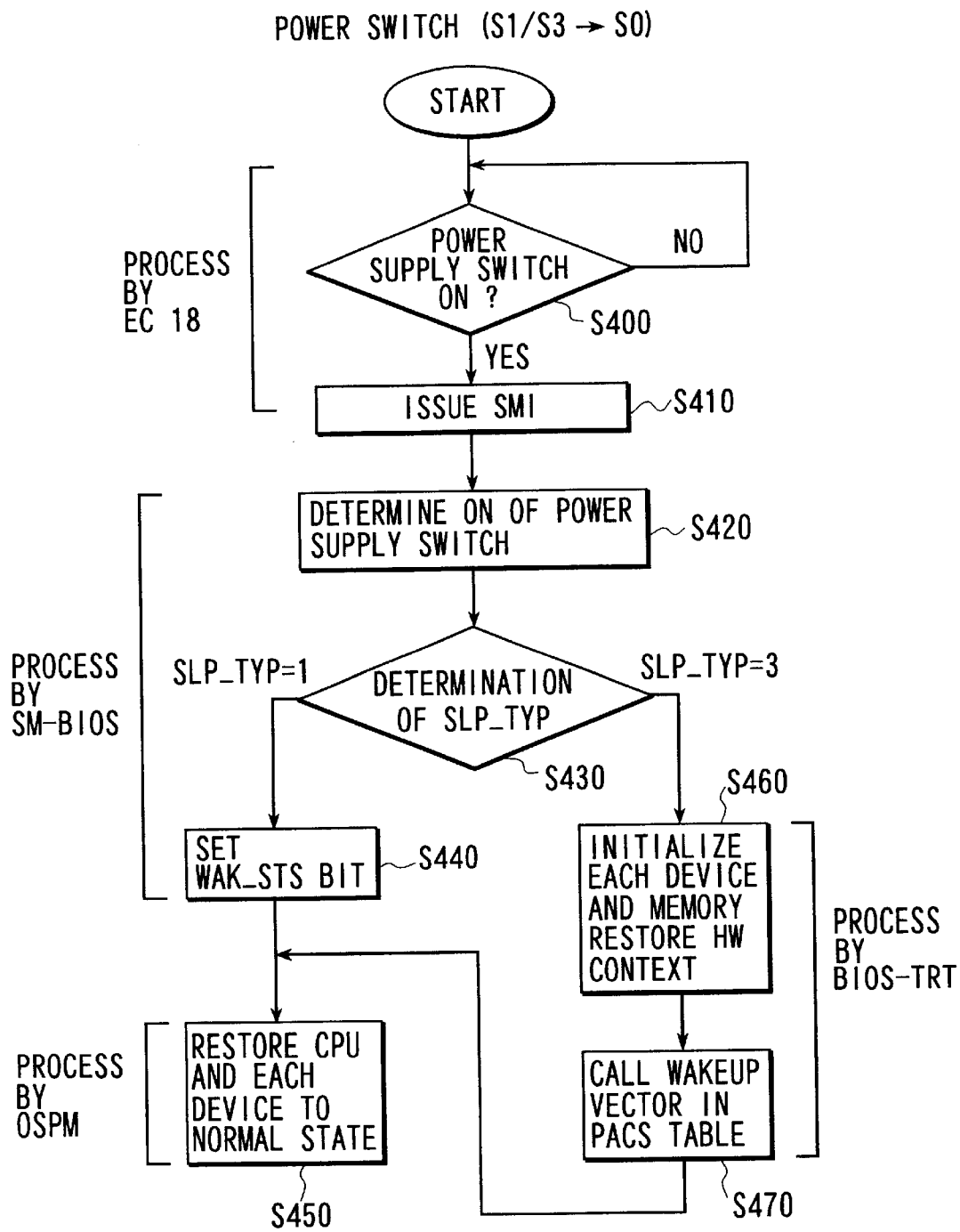
FIG. 8 is a flow chart explaining how event notification (S1/S3→S0) is performed in connection with the power supply switch of the computer system.

FIG. 8 is a flow chart explaining how event notification (S1/S3→S0) is performed in connection with the power supply switch of the computer system.

When the power supply switch is pushed again, the EC 18 issues an SMI, thereby activating the SM-BIOS (Steps 400 and 410). The SM-BIOS determines in which sleep state the system remains now, from the value set at the three SLP_TYP bits (Steps 420 and 430).

If SLP_TYP=1, the SM-BIOS releases the IRQ/SMI mask, sets the WAK_STS bit in the PM1a_STS register, supplies a clock signal to the CPU 11 which is set in the stop clock state. STPCLK# is thereby rendered inactive (Step 440). The OSPM monitors the state of the WAK_STS bit at regular intervals. If the WAK_STS bit is set at a specific value, the OSPM wakes up the devices before setting the system into the S1 state (Step 450).

If SLP_TYP=3, the BIOS-IRT initializes the devices and the main memory, restores the HW context in the devices, and calls the wakeup vector provided in the FACS table (Steps 460 and 470). Thereafter, the OSPM determines that the system stays in the S3 state, because the SLP_TYP bits are set at 3. The OSPM then sets the system into the S0 state (Step 450).

The factor of the wakeup event described above is not limited to the power supply switch. Rather, it may be an alarm signal supplied form the RTC, a signal generated when the display panel is opened or closed, or a ring signal supplied from the modem. If the factor of the wakeup event is an alarm signal supplied from the RCT, the SM-BIOS sets the RTC_STS bit in the PM1a_STS register and issues a PME to the OSPM.

Figure 9:
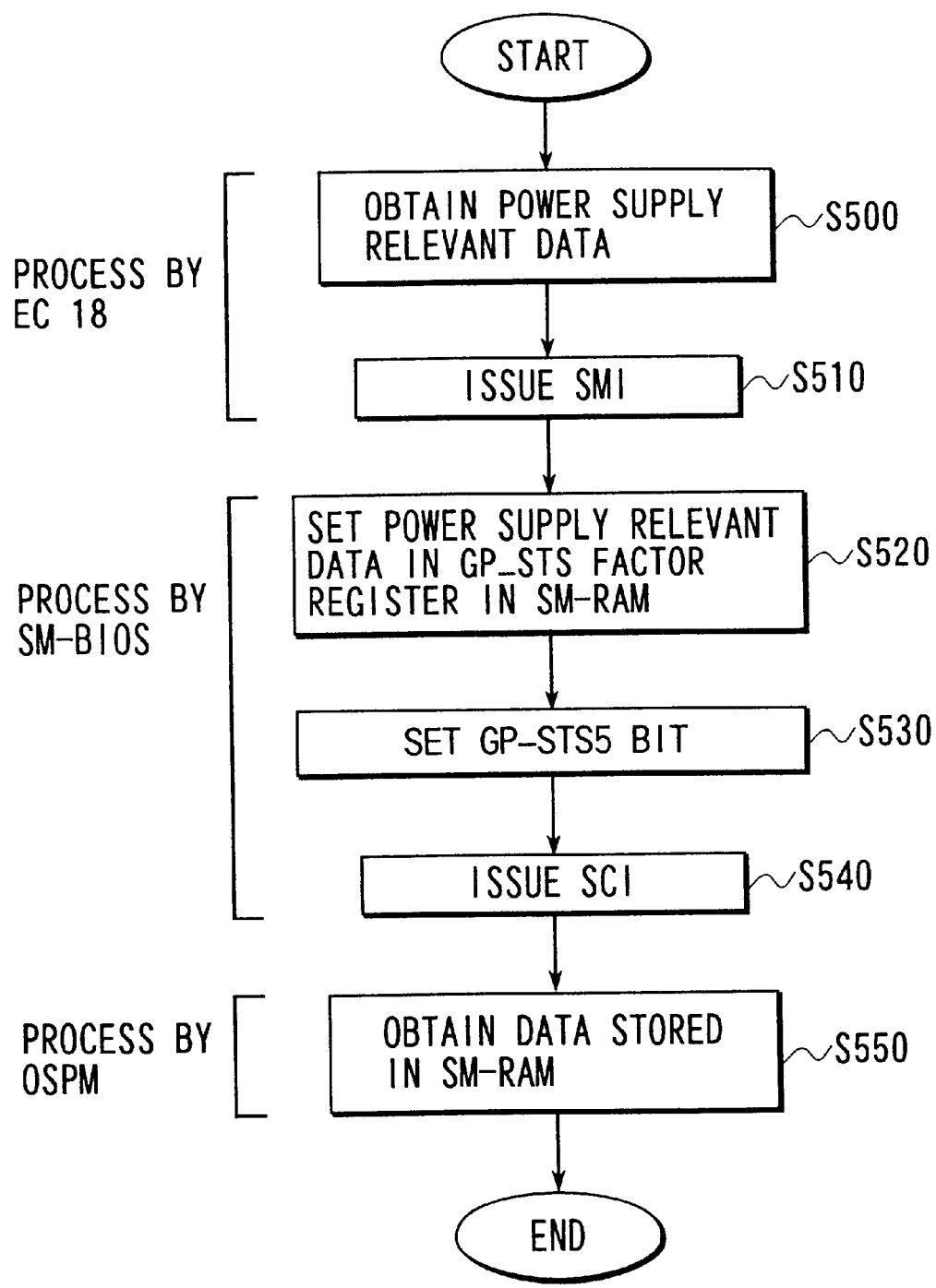
FIG. 9 is a flow chart showing the sequence of notification of an event related to the power supply, which is performed in the computer system.

FIG. 9 is a flow chart showing the sequence of notification of an event related to the power supply, which is performed in the computer system.

The power supply controller 16 supplies power-related data items to the EC 18. Among these data items are a data item representing a change of the power remaining in the battery and a data item showing the state of the AC adapter. After receiving the power-related data items, the EC 18 issues an SMI, thereby activating the SM-BIOS (Steps 500 and 510).

Figure 10:
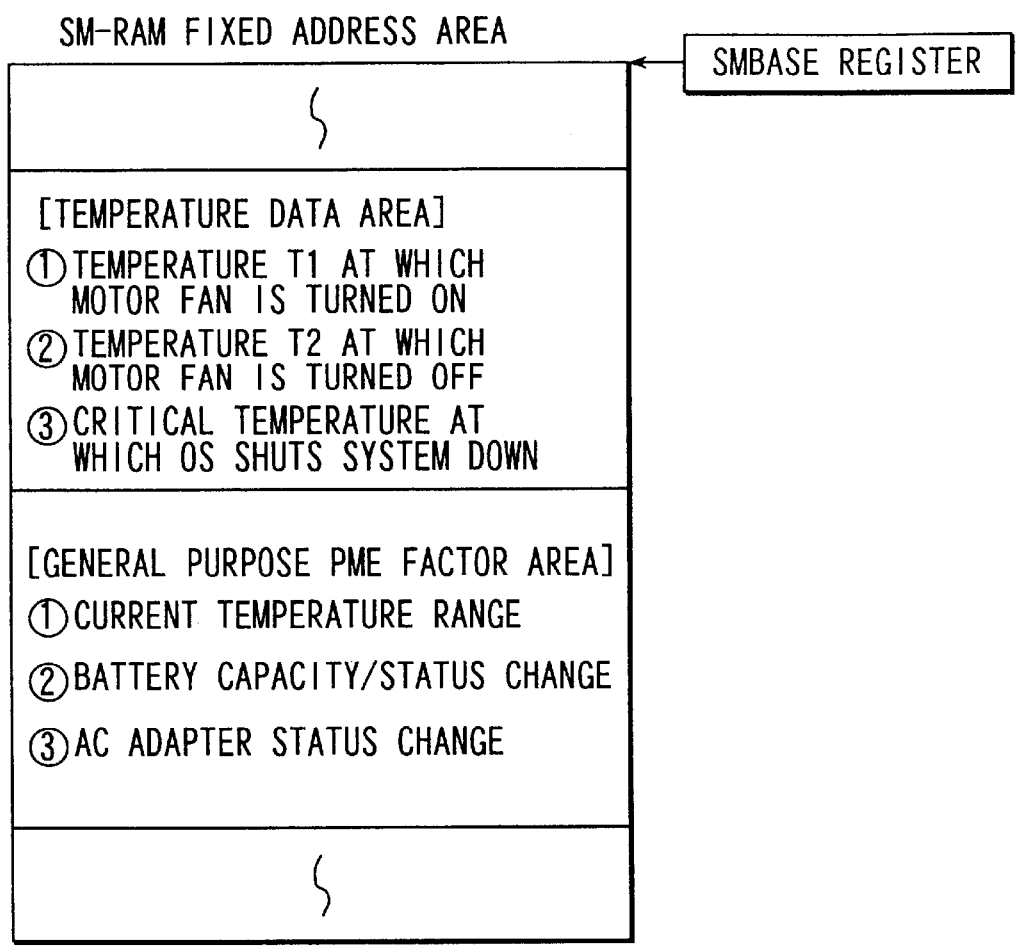
FIG. 10 is a diagram illustrating the general-purpose Power Management Event PME factor area and the temperature data area, both provided in the SMRAM incorporated in the computer system.

The SM-BIOS sets the power-related data items acquired via the power supply controller 16 in the GP_STS factor register provided in the general-purpose PME factor area of the SM RAM shown in FIG. 10 (Step 520). Further, the SM-BIOS sets the GP_STS5 bit in the PM1a_STS register (Step 530). When the GP-STS5 bit is set in the PM1a_STS register, the SM_BIOS automatically issues an SCI, thus informing the OSPM of the PME (Step 540).

The OSPM receives the data output from the ACPI register (i.e., the GP_STS5 bit), by using the SCI, and receives the data stored in the SMRAM (Step 550). The OSPM performs power supply management in accordance with the contents described in P codes in the differentiated system description table (DSDT).

Figure 11:
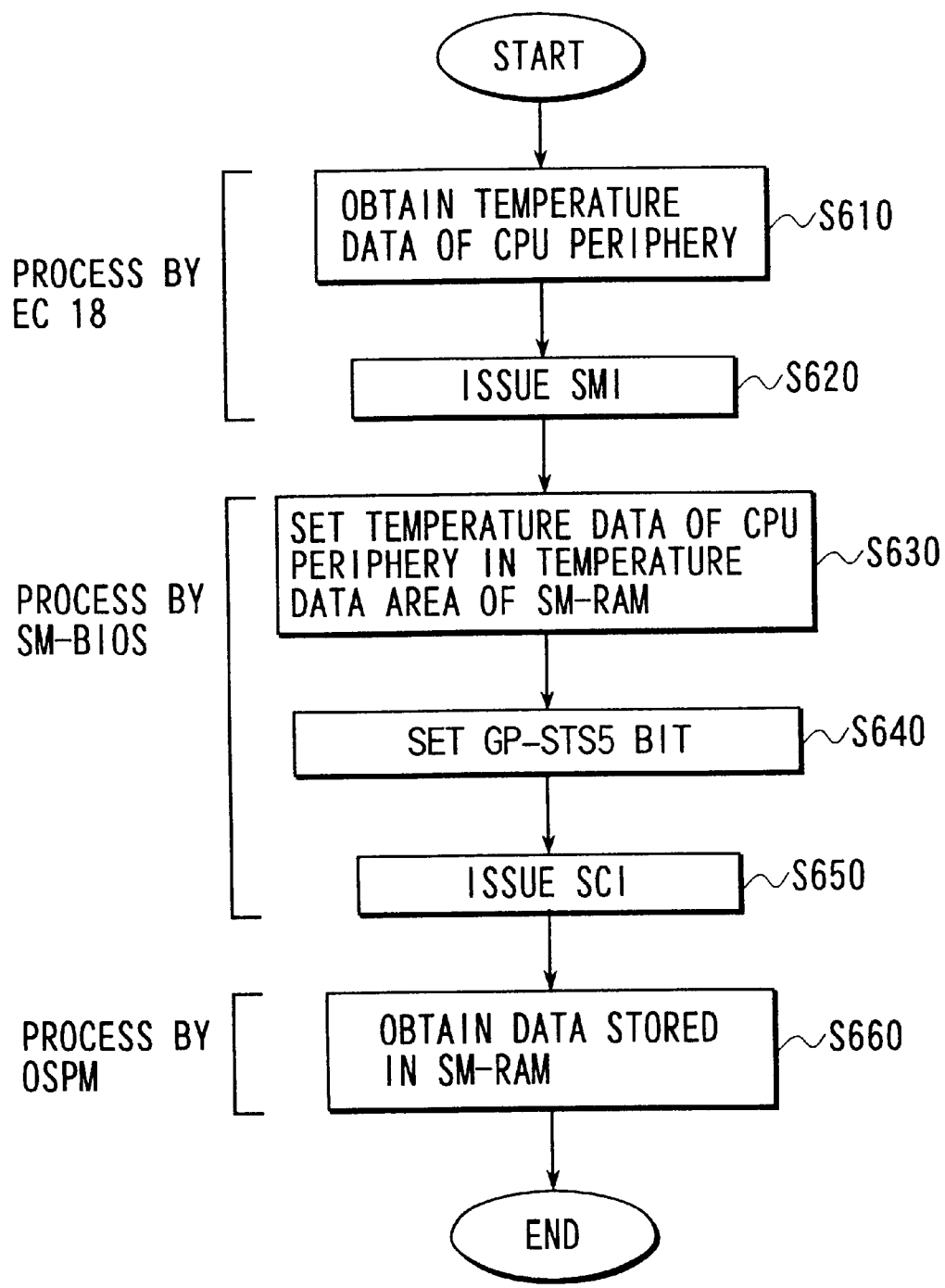
FIG. 11 is a flow chart depicting the sequence of notifying the temperature ambient to the CPU of the computer system.
Figure 13:
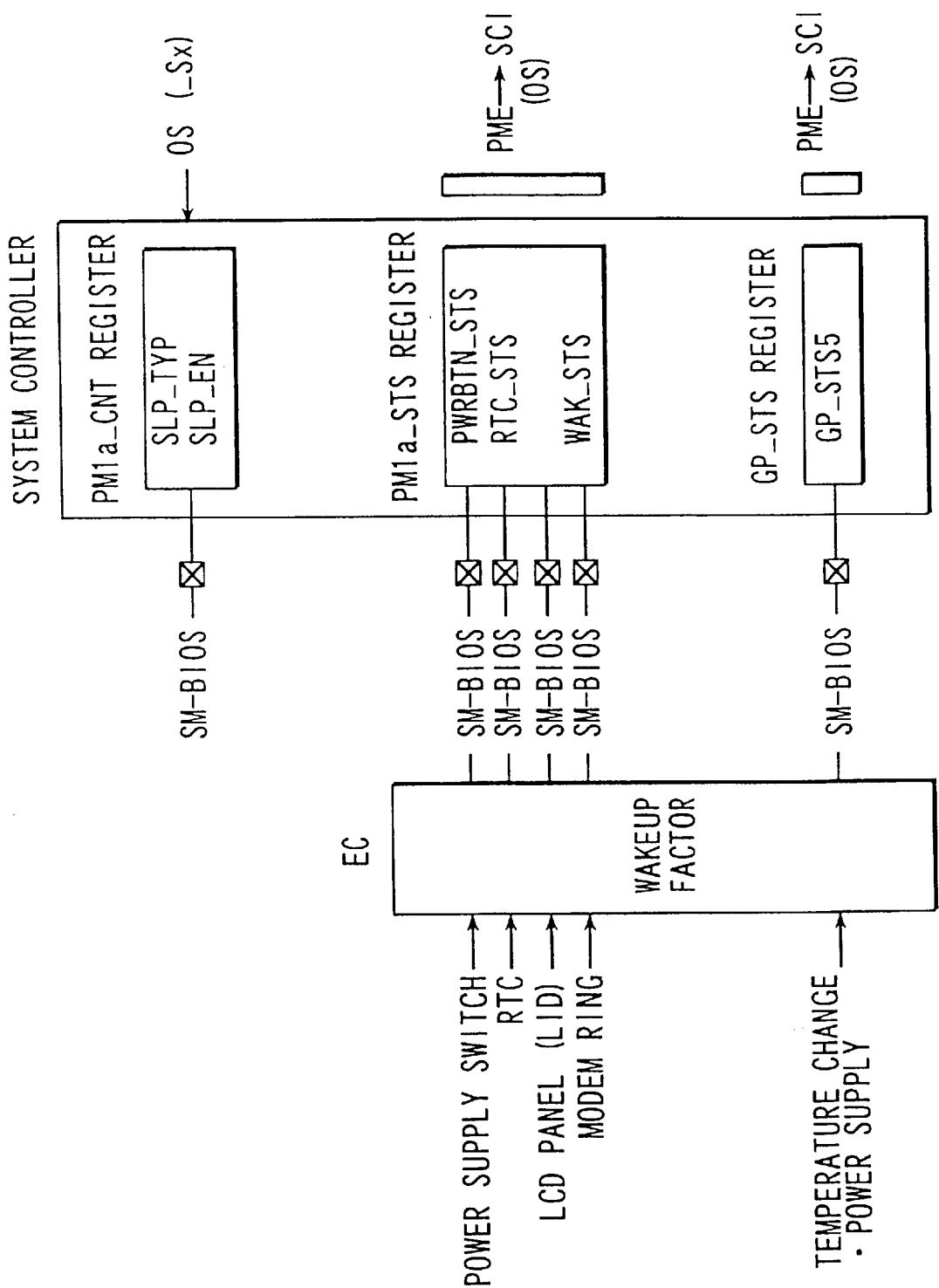
FIG. 13 is a diagram illustrating event notification from the EC (Embedded Controller) to the OSPM, which is performed in the computer system.

FIG. 11 is a flow chart depicting the sequence of notifying the temperature ambient to the CPU 11.

The data representing changes in the temperature ambient to the CPU 11 is supplied to the embedded controller (EC) 18 at regular intervals of 5 minutes (Step 610). Upon receipt of the data showing a change in the temperature, the EC 18 issues an SMI, thereby activating the SM-BIOS (Step 620).

The SM-BIOS sets the temperature data at the prescribed bits located in the temperature data area of the SMRAM (Step 630). More specifically, as shown in FIG. 10, the SM-RAM has a temperature data area and a general purpose PME factor area. The temperature data area stores 1) a temperature T1 at which motor fan is turned on, 2) a temperature T2 at which motor fan is turned off, and 3) a critical temperature ata which the OS shuts system down. Further, the general-purpose PME factor area stores 1) a current temperature change, 2) a battery capacity/status change, and 3) an AC adapter status change. The SM-BIOS then sets the GP_STS5 bit in the PM1a_STS register (Step 640). When the GP_STS5 bit is set, the SM-BIOS automatically issues an SCI, thus informing the OSPM of the PME (Step 650). The OSPM receives the data output from the ACPI register (i.e., the GP_STS5 bit), by using the SCI, and informs the OS of the data already stored in the SMRAM (Step 660).

Figure 12:
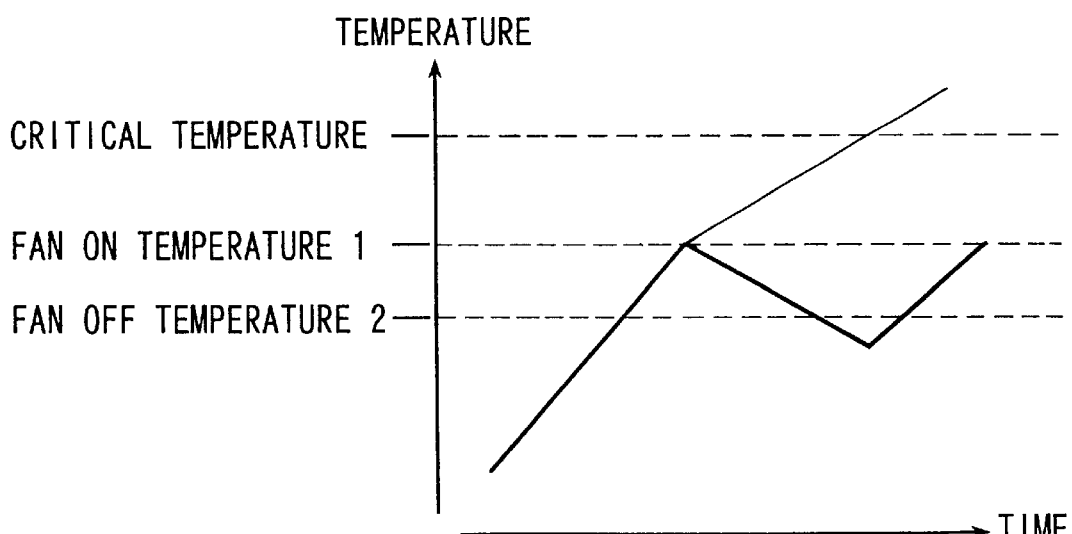
FIG. 12 is a chart explaining how the electric fan is controlled in the computer system in accordance with the temperature ambient to the CPU.

How the OSPM controls the temperature ambient to the CPU 11 by using temperature-control P codes will be explained with reference to the timing chart of FIG. 12.

Upon determining that the temperature ambient to the CPU 11 has reached fan-on temperature T1, the OSPM executes the ON process of the motor fan 20 described in the DSDT. During this process, the OSPM changes the temperature to fun-off temperature T2. Upon determining that the temperature falls to the fan-off temperature T2, the OSPM executes the OFF process of the motor fan 20 described in the DSDT. Again, the OSPM changes the temperature to fan-on temperature T1. Upon determining from the SMRAM that the temperature has reached the critical temperature, the OSPM executes a system shutdown process.

Described above is an embodiment of the fan control due to the temperature change in the active mode. Then present invention can also be applied to a CPU speed control due to the temperature change in the passive mode.

The fan-on temperature, the fan-off temperature, and the critical temperature are set in accordance with a table provided in the BIOS-ROM. The values described in this table are set in the temperature data area of the SMRAM, which is shown in FIG. 10, and are used to accomplish cooling control.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A sleep control method of an operating system-directed power management (OSPM) system in a computer system provided with a central processing unit (CPU) operable in at least one of first and second modes, wherein in the first mode the CPU operates in a first memory address space using a first memory i management system and in the second mode the CPU operates in a second memory address space using a second memory management system, an operating system (OS) incorporating a power management function, and a system controller, the method comprising:

discriminating, by the OS, a wakeup factor set in a register of the system controller in response to a system control interrupt, wherein the wakeup factor is discriminated as at least a depression of a power-supply switch, an issuance of alarm signal by a real time clock (RTC), open/close of a flat panel, and a wakeup from a modem link;

setting, by the OS, a sleep type and a sleep enable indicator;

issuing, by the OS, a system management interrupt (SMI) to the CPU to switch an operation mode of the CPU from the first mode to the second mode in response to the setting the sleep type and the sleep enable indicator to start a system management basic input and output system (SM-BIOS); and performing, by the SM-BIOS, a process corresponding to the set sleep type in response to the issued SMI.

2. A sleep control method of an operating system-directed power management (OSPM) system in a computer system provided with a central processing unit (CPU) operable in at least one of first and second modes, wherein in the first mode the CPU operates in a first memory address space using a first memory management system and in the second mode the CPU operates in a second memory address space using a second memory management system, an operating system (OS) incorporating a power management function, and a system controller, the method comprising:

discriminating, by the OS, a temperature event set in a system-management random access memory (SM-RAM) in response to a system control interrupt, wherein the temperature event is discriminated as at least a current temperature change, a battery capacity/status change, and an AC adaptor status change;

issuing, by the OS, a system management interrupt (SMI) to the CPU to switch an operation mode of the CPU from the first mode to the second mode to start a system management basic input and output system (SM-BIOS); and performing, by the SM-BIOS, a process corresponding to the temperature event set in the SM-RAM.

3. A method of notifying an event in a computer, the method comprising:

issuing, upon detecting an operation of a power switch, a system management interrupt (SMI) to set an operating mode of the computer to a system management mode to execute a system management program designed for power management and activate a system management BIOS (SM-BIOS);

determining by the SM-BIOS whether or not the SMI is issued based on the operation of the power switch;

issuing by the SM-BIOS a system control interrupt (SCI) if it is determined that the SMI is issued based on the operation of the power switch;

determining by an operating system (OS) whether or not a computer is to be set to a suspended state;

setting by the OS a sleep instruction in a register;

issuing the SMI to activate the SM-BIOS; and setting by the SM-BIOS the computer to the suspended state based on the sleep instruction set in the register.

4. The method according to claim 3, further comprising:

issuing a system management interrupt (SMI) to set an operating mode of the computer to a system management mode to execute a system management program designed for power management and to activate a system management BIOS (SM-BIOS) upon detecting an operation of a power switch;

determining by the SM-BIOS whether or not the SMI is issued based on the operation of the power switch;

determining by the SM-BIOS that the computer is set to which one of a plurality of suspended states;

setting by the SM-BIOS a wake-up instruction in the register; and waking-up by the OS the computer based on the wakeup instruction set in the register.

5. A method of notifying a power supply relevant event in a computer, the method comprising:

notifying, by a power supply controller, power supply relevant data to an embedded controller;

issuing, by the embedded controller, a system management interrupt (SMI) including the power supply relevant data to set an operating mode of the computer to a system management mode to execute a system management program designed for power management and activate a system management BIOS (SM-BIOS);

setting by the SM-BIOS the power supply relevant data in a register;

issuing by the SM-BIOS a system control interrupt (SCI) to activate an operating system (OS); and obtaining by the OS the power supply relevant data set in the register and performing a power management processing based on the obtained power supply relevant data.

6. A method of notifying a temperature event in a computer, the method comprising:

notifying, by a temperature sensor, temperature data to an embedded controller;

issuing by the embedded controller a system management interrupt (SMI) including the temperature data to set an operating mode of the computer to a system management mode to execute a system management program designed for power management and activate a system management BIOS (SM-BIOS);

setting by the SM-BIOS the temperature data in a register;

issuing by the SM-BIOS a system control interrupt (SCI) to activate an operating system (OS); and obtaining by the OS the temperature data set in the register and performing a temperature management processing based on the obtained temperature data.

7. The method according to claim 6, wherein said temperature data is an ambient temperature of the computer, said method further comprising:

comparing the ambient temperature with a first threshold temperature; and cooling the computer when the ambient temperature is higher than the first threshold temperature.

8. The method according to claim 7, further comprising:

comparing the ambient temperature with a second threshold temperature which is higher than the first threshold temperature; and executing a shutdown processing when the ambient temperature becomes higher than the second threshold temperature.

\* \* \* \* \*

UNITED STATES PATENT AND TRADEMARK OFFICE
CERTIFICATE OF CORRECTION

PATENT NO.    : 6,446,213 B1
DATED         : September 3, 2002
INVENTOR(S)   : Yamaki It is certified that error appears in the above-identified patent and that said Letters Patent is hereby corrected as shown below:

<u>Column 13,</u>
Line 35, change "first memory i" to -- first memory --.

<u>Column 14,</u>
Line 20, before "activate" insert -- to --.

Signed and Sealed this

Twenty-fifth Day of March, 2003

JAMES E. ROGAN
*Director of the United States Patent and Trademark Office*